United States Patent [19]

Furukawa

[11] Patent Number: 4,639,041

[45] Date of Patent: Jan. 27, 1987

[54] HEADREST MOUNTING STRUCTURE FOR A VEHICLE SEAT

[75] Inventor: Toshio Furukawa, Akishima, Japan

[73] Assignee: Tachikawa Spring Co., Ltd., Tokyo, Japan

[21] Appl. No.: 747,442

[22] Filed: Jun. 21, 1985

[30] Foreign Application Priority Data

Jul. 31, 1984 [JP] Japan ............................ 59-118945[U]

[51] Int. Cl.$^4$ .............................................. A47C 7/36
[52] U.S. Cl. ...................................... 297/391; 297/410
[58] Field of Search ................................. 297/410, 391

[56] References Cited

U.S. PATENT DOCUMENTS

| | | | |
|---|---|---|---|
| 3,376,064 | 4/1968 | Jackson | 297/410 X |
| 3,498,672 | 3/1970 | Leichtl | 297/410 |
| 3,512,832 | 5/1970 | Kage | 297/410 |
| 3,635,527 | 1/1972 | Weber | 297/410 |
| 4,489,979 | 12/1984 | Zyngier | 297/410 |

Primary Examiner—Francis K. Zugel
Attorney, Agent, or Firm—Cushman, Darby & Cushman

[57] ABSTRACT

A headrest mounting structure to be provided in seats for vehicles such as automobiles is disclosed in which two spaced stays for supporting a headrest onto a seat back are respectively inserted into two support tubes provided in the seat back and the two support tubes are respectively inserted through a pair of brackets fixed to the seat back. Each of insertion bores formed in the brackets for insertion of the support tubes and insertion bores formed in the support tubes for insertion of the stays is formed as an elongated bore having a straight portion extending transversely of the seat back. Such elongated insertion bores permit compensation of errors in the distances between the stays as well as between the support tubes.

2 Claims, 8 Drawing Figures

HEADREST MOUNTING STRUCTURE FOR A VEHICLE SEAT

BACKGROUND OF THE INVENTION

1. Field of the Invention

The present invention relates to a headrest mounting structure for a seat used in a vehicle such as an automobile, and, in particular, to a mounting structure for a headrest of the type that is supported onto a seat back by means of two stays.

2. Description of the Prior Art

One of the conventional headrests for vehicle seats is constructed such that it can be attached to the seat back by inserting a pair of stays respectively provided on the right and left portions thereof into the seat back. In other words, as shown in FIGS. 7 and 8, a pair of right and left brackets (23) are fixedly secured to a seat back frame (22), and two support tubes (24) are inserted into the brackets (23), respectively. Then, the stays (21) of the headrest (a) are inserted into the support tubes (24), respectively. The brackets (23) and support tubes (24) are respectively formed with insertion bores (23a), (24a) each having a circular section, and the support tubes (24) and the headrest stays (21) are coaxially fitted into and secured to these insertion bores (23a), (24a), respectively.

In such headrest mounting structure mentioned above, in order to prevent the longitudinal play of the headrest (a), a quite limited tolerance is given in dimension to every part of the structure. Consequently, if, in forming, there is produced any error in spacing between the right and left stays (21) and/or between the right and left support tubes (24), then the stay (1) can not be properly matched to the insertion bore (24a) in the support tube (24), which makes it difficult to mount the headrest, resulting in a reduced working efficiency in mounting.

SUMMARY OF THE INVENTION

The present invention aims at eliminating the above-mentioned drawbacks found in the conventional headrest mounting structures.

Accordingly, it is an object of the invention to provide an improved headrest mounting structure which is capable of absorbing any errors occurring in spacing between its right and left stays and/or between its support tubes to prevent any play in the headrest.

In accomplishing this object, according to the invention, a pair of right and left brackets fixed to a seat back frame are respectively formed with insertion bores each comprising an elongated bore having a straight-line portion extending in a transverse direction of a seat back, and the support tubes are inserted into and fixed to the insertion bores, respectively, while the support tubes are respectively formed with elliptical insertion bores each extending in an axial direction and having in section a straight-line portion extending in the transverse direction of the seat back, and the headrest stays are inserted into the elliptical insertion bores, respectively.

In the above-mentioned structure, the insertion bores in the support tubes allow the fitting of the stays within the range of their respective transverse length to absorb errors in the distance between the stays, and at the same time the insertion bores in the brackets allow the fitting of the support tubes within the range of their respective transverse length to absorb errors in the distance between the support tubes.

Other objects and advantages of the invention will become apparent during the following discussion of the accompanying drawings.

DETAILED DESCRIPTION OF A PREFERRED EMBODIMENT OF THE INVENTION

Figure 1:
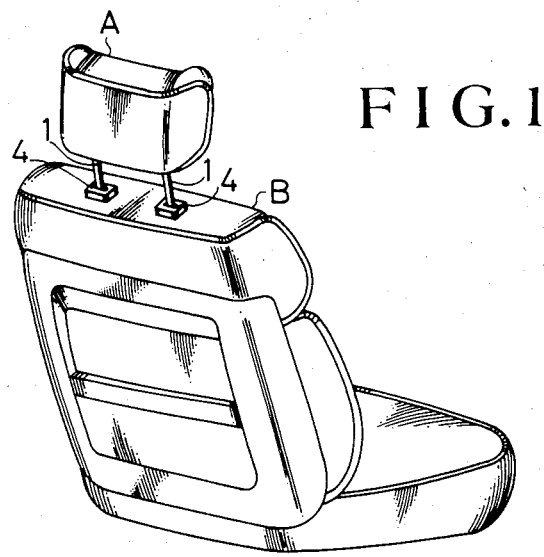
FIG. 1 is a perspective view of an embodiment of the present headrest mounting structure.
Figure 2:
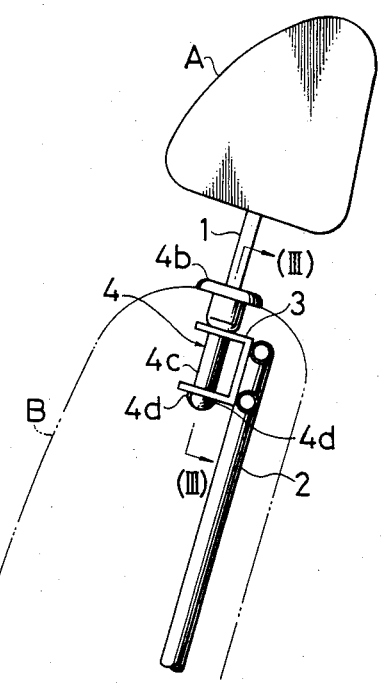
FIG. 2 is a side sectional view of the above structure.
Figure 3:
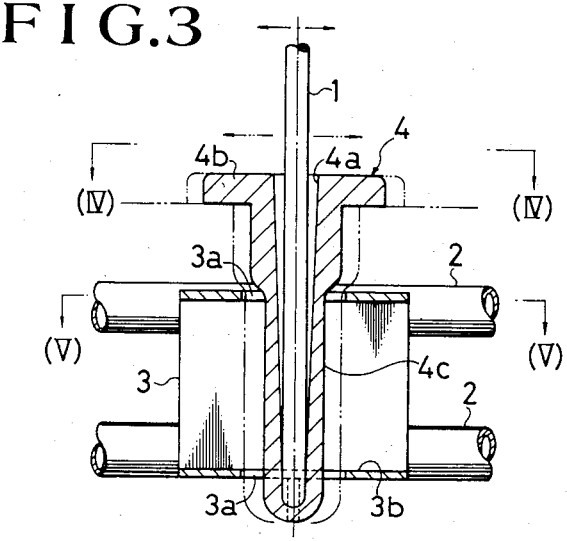
FIG. 3 is an enlarged section view taken on line (III)—(III) in FIG. 2.
Figure 4:
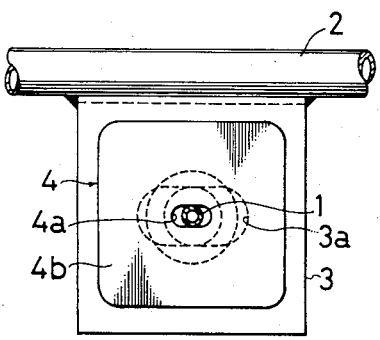
FIG. 4 is a section view taken on line (IV)—(IV) in FIG. 3.
Figure 5:
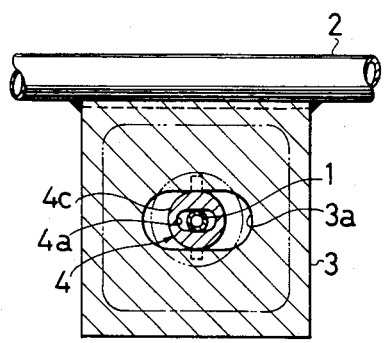
FIG. 5 is a section view on line (V)—(V) in FIG. 3.
Figure 6:
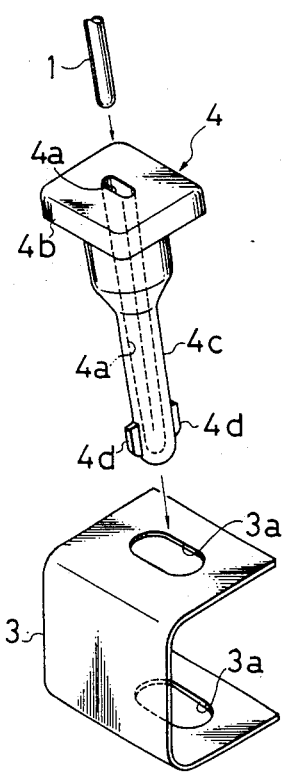
FIG. 6 is an exploded perspective view of one of the main portions of the above mounting structure.
Figure 7:
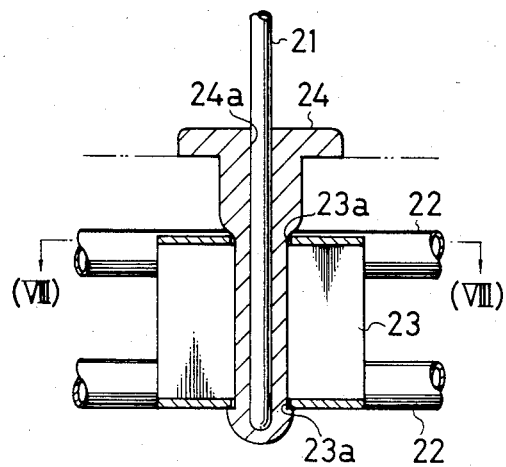
FIG. 7 is a front section view of a conventional headrest mounting structure; and, FIG. 8 is a section view taken along line (VIII)—(VIII) in FIG. 7.
Figure 8:
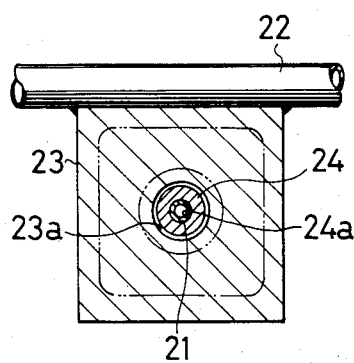

As shown in FIGS. 1 through 6, according to a preferred embodiment of a headrest mounting structure of the invention, insertion bores (3a) formed in the brackets (3) for mounting support tubes (4) and insertion bores (4a) formed in the support tubes (4) for receiving stays (1) cooperate to absorb errors in the distances between the stays (1) and/or between the support tubes (4), if any errors are present.

Each of the brackets (3) is a member formed of a metal plate and having a U-shaped side configuration. Two such brackets are fixedly welded to the right and left portions of the upper portion of a seat back frame (2) included in a seat back (B) in a pair, and each of the paired brackets (3) is formed with the insertion bores (3a) in its respective upper and lower plates. Each of the insertion bores (3a) comprises an elongated bore having a straight-line portion extending transversely of the seat back (B) and allows the fitting of the associated support tube (4) therein within the range of its transverse length.

The support tube (4) is formed of synthetic material and is formed with an insertion bore (4a) which extends from the upper surface of its head portion (4b) to be in abutment against the upper end of the seat back (B) through the lower portion of its leg portion (4c) to be inserted into the bracket (3). The insertion bore (4a) has an elliptic section having a straight portion extending transversely of the seat back so as to allow the fitting of the stay (1) within the range of its transverse length, and, when viewed vertically, forms a taper bore downwardly tapered such that the length of the straight portion in the above section is gradually reduced as it goes down. On the other hand, the support tube (4) is provided with a pair of projections for removal prevention on the outer peripherals of the lower end portion in the leg portion (4c) thereof. When the two projections (4d) are engaged with the lower surface of the lower plate (3b) of the bracket (3), they retain the support tube (4) and prevent it from removing from the bracket (3).

Thus, according to the above-mentioned embodiment of the present invention, in mounting the headrest (A), when there exists any error in the distance between right and left stays (1), each of the stays (1) can be displaced a distance corresponding to the error in either right or left direction of the associated insertion bore (4a) of the support tube (4) from the center thereof so as to be fitted and inserted into the insertion bore (4a) of the support tube (4).

Also, for any error in the distance between the support tubes (4), the error can be compensated by displacing the insertion position of the support tube (4) with respect to the insertion bore (3a) of the bracket (3) in either right or left direction of the insertion bore (3a) from the central position of the insertion bore (3a).

As mentioned above, the insertion bores (3a) and (4a) respectively formed in the brackets (3) and the support tubes (4) can cooperate with each other to absorb the errors in the distances between the stays (1) and between the support tubes (4), so that the respective stays (1) can be matched to and inserted into the associated insertion bores (4a) of the support tubes (4) securely.

Further, since each of the insertion bores (4a) in the support tube (4) comprises such taper bore as described before, when the stay (1) reaches the lower end of the insertion bore (4a) and remains there, the stay (1) is fitted into the insertion bore (4a) with little clearance therebetween to prevent the headrest (A) from playing in its longitudinal or transverse direction.

Although the illustrated support tube (4) is closed at the lower end of the insertion bore (4a), it may be open there so that the stay (1) can be extended through the support tube (4).

In addition, the illustrated support tube (4) is formed with split grooves in the lower end thereof. These split grooves cause the lower end of the support tube (4) to produce elasticity in its diametral direction, which enables the above-mentioned removal-preventive projections (4d) to be brought into engagement with the lower surface of the lower plate (3) of the bracket (3).

As discussed hereinbefore, according to the invention, because the errors in the distances between the stays and between the support tubes can be respectively compensated by the insertion bores in the support bores and the insertion bores in the brackets, it is possible to insert the stays into the insertion bores in the support tubes simply and positively independent of the above errors, which enhances the working efficiency in mounting the headrest.

Also, because the above-mentioned insertion bores are formed as elongated bores extending in the transverse direction of the seat back or as bores having elliptical sections and extending in the transverse direction of the seat back, the headrest is prevented from playing in the longitudinal direction thereof.

What is claimed is:

1. A headrest mounting structure for a vehicle seat in which there are provided a pair of spaced-apart headrest stays for supporting a headrest on a seat back of the vehicle seat with the seat back extending generally in a selected plane transversly of said vehicle, comprising:

a pair of brackets each having an upper plate and a lower plate, said brackets being fixed to a seat back frame of said vehicle seat in a spaced-apart relationship with each other, each of said upper and lower plates being formed with an elongated insertion bore having a straight-line portion which extends in a transverse direction generally parallel of said selected plane of said seat back; and a pair of support tubes to be respectively inserted into said elongated insertion bores of said brackets, each of said support tubes having an insertion bore formed co-axially therewithin, said insertion bore being of an elliptical shape in section and including a straight-line portion which extends in a transverse direction generally parallel to the selected transverse plane of said seat back, and further each of said support tubes comprising a head portion to be abutted against the upper end of said seat back and a leg portion to be inserted through said elongated insertion bores of said brackets, said leg portion being so formed as to have a circular shape in section such that said tubes may be displaced to the right or to the left from the center of said insertion bores of said brackets, whereby said pair of headrest stays are respectively inserted into said insertion bores of said support tubes.

2. The headrest mounting structure according to claim 1, wherein each of said insertion bores in said support tubes is formed such that it is gradually reduced in diameter as it proceeds down to the bottom portion of said support tubes and further is so formed as to have substantially the same configuration as the outer peripheral configuration of said stay in the lowest end thereof.

* * * * *